No. 847,657. PATENTED MAR. 19, 1907.
W. W. DOOLITTLE.
STEAM TRAP.
APPLICATION FILED NOV. 9, 1905.

WITNESSES
Harvey Lechner
Archworth Martin

INVENTOR
William W. Doolittle
by attys
Synnestvedt & Carpenter

THE NORRIS PETERS CO., WASHINGTON, D. C.

No. 847,657. PATENTED MAR. 19, 1907.
W. W. DOOLITTLE.
STEAM TRAP.
APPLICATION FILED NOV. 9, 1905.

WITNESSES
INVENTOR

No. 847,657. PATENTED MAR. 19, 1907.
W. W. DOOLITTLE.
STEAM TRAP.
APPLICATION FILED NOV. 9, 1905.

WITNESSES
Harvey Lechner
Archworth Martin

INVENTOR
William W. Doolittle
by attys
Symestredt & Carpenter

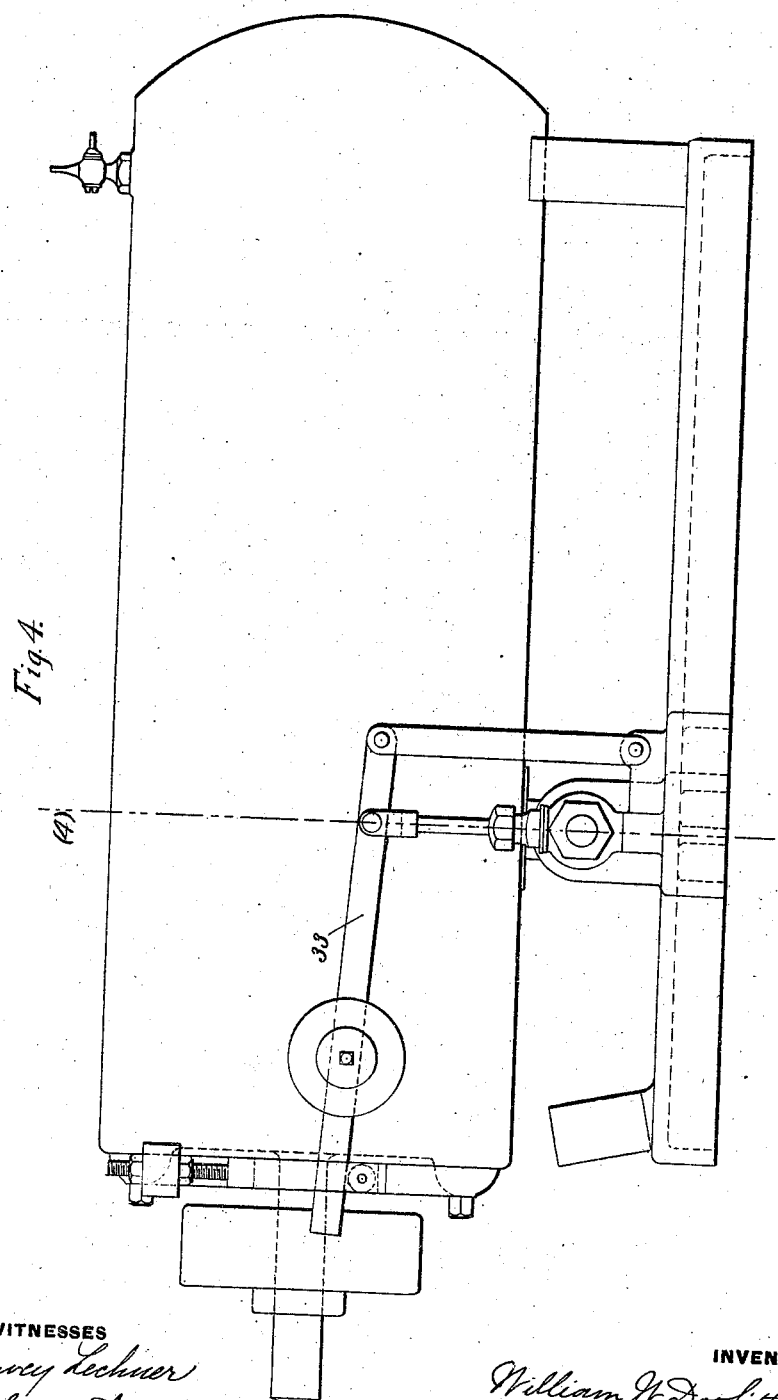

UNITED STATES PATENT OFFICE.

WILLIAM W. DOOLITTLE, OF EVANSTON, ILLINOIS, ASSIGNOR TO CRANE COMPANY, OF CHICAGO, ILLINOIS, A CORPORATION OF ILLINOIS.

STEAM-TRAP.

No. 847,657.

Specification of Letters Patent.

Patented March 19, 1907.

Application filed November 9, 1905. Serial No. 286,560.

*To all whom it may concern:*

Be it known that I, WILLIAM W. DOOLITTLE, a citizen of the United States, residing at Evanston, and State of Illinois, have invented certain new and useful Improvements in Steam-Traps, of which the following is a specification.

The object of this invention is to provide a construction of gravity operated return and non-return steam traps in which the tank is normally tilted, and in which the accumulation of water causes the tank to swing to a horizontal position as opposed to the old type of steam trap in which the tank is normally horizontal and swings to a tilting position in order to discharge. Applicant's arrangement is accompanied with certain advantages over the old construction which are hereinafter set forth. A further object is the production of a trap in which the construction is simplified and the cost is decreased, while the general efficiency is increased. The board ideas involved are applicable both to return traps and non-return traps, and the preferred constructions are set forth in the accompanying drawings, wherein—

Figure 4 is a side elevation showing the invention as applied to a non-return trap in position of discharge.

Figure 1:
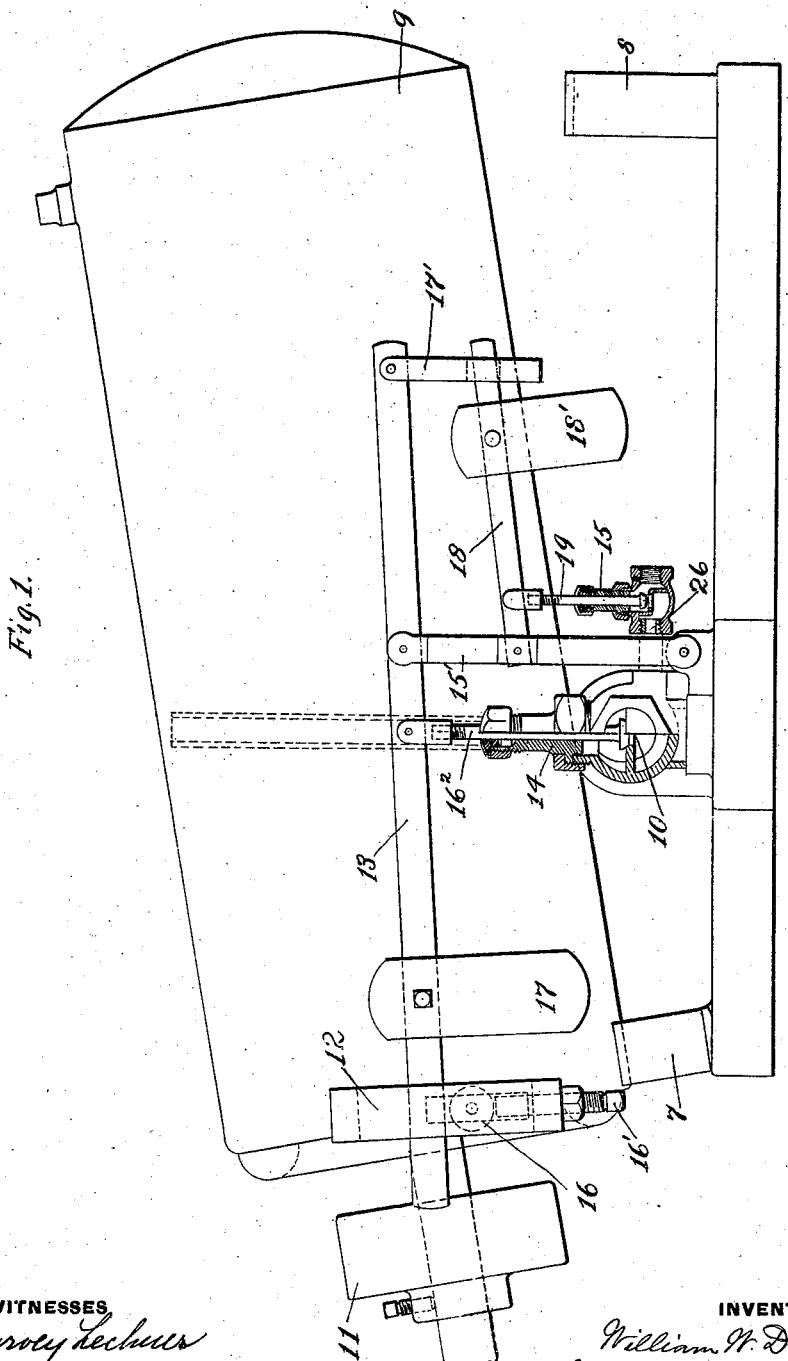
Figure 1 is a side elevation of the return trap in its normal or empty position, the valve casing being partially broken away to show the position of the valves.
Figure 2:
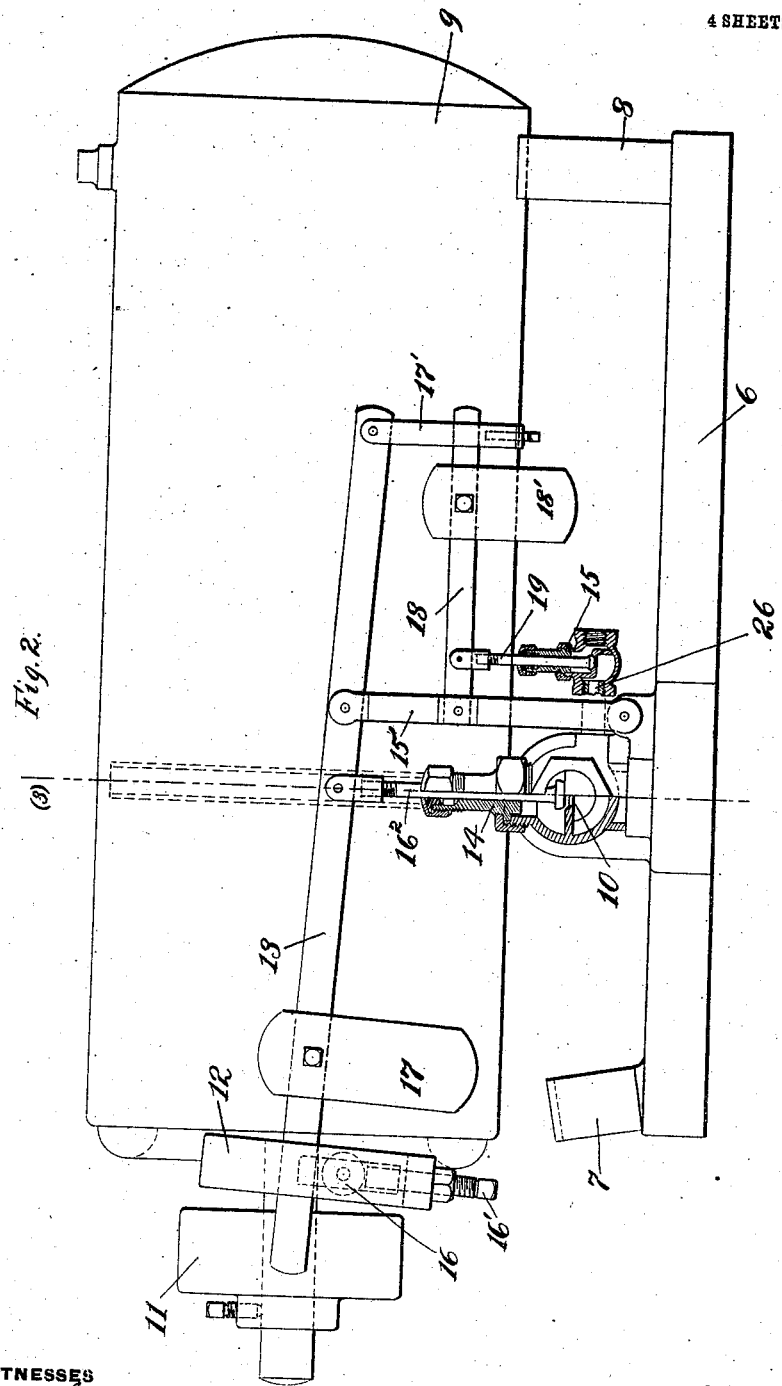
Figure 2 is a similar view, but showing the tank in the position of discharge.

The device belongs to that type of steam traps in which an accumulation of water overbalances a counter-weight and tilts the tank, and opens a valve whereby the accumulated water is discharged. In the case of the return trap in which it is desired to return the water to the boiler, the outflow pipe is connected to the boiler and the tilting of the trap operates another valve to admit live steam from the boiler. This permits the escape of the water from the tank as the pressure of the live steam in connection with the elevated position of the tank is sufficient to force the water into the boiler. In the non-return trap, no provision is necessary for forcing the water out as it can escape by virtue of its weight. The above broad construction is old and applicant's invention, which, operates on the general lines above set forth, relates to a particular new and advantageous form of apparatus for carrying out the above stated operation. In the old form of apparatus the tank when empty was arranged to stand in a horizontal position, and when ready to discharge occupied a position at an angle to the horizontal, and the discharge, in order to be from the lowest part of the tank when in the tilted position, was connected to the extreme lower corner or edge at the end of the tank, and with the hollow trunnion or axis on which the tank tilted. With this construction it will be clear that the end of the tank at the point of the discharge connection must necessarily be when in tilted position above the trunnion in order to discharge the water by gravity, thus necessitating the elevation of the tank a considerable distance above its trunnion. Furthermore, the discharge from this point of the tank necessarily requires a pipe leading from the end of the tank to the trunnion. In applicant's construction, a reversal of the above general arrangement is made and the tank is arranged to be, when in normal or empty position, tilted as shown in Figure 1, and when in full or discharge position, horizontal, as shown in Figure 2. This rearrangement of parts results in important advantages. In the first place, the trunnion or hollow axis may be placed as close as desired to the tank as opposed to the arrangement in the other form in which the tank must necessarily be at a sufficient height above the trunnion to discharge when the tank is tilted and the discharge opening is in its lowest position. In the second place the discharge from the tank may be directly above the trunnion and no additional connection pipe running along the body of the tank from the discharge opening in the tank to the trunnion is necessary. In the third place, it will be apparent from inspection that the trunnion in applicant's construction may be placed nearer the center of the tank than in the old constructions and thereby the counter-weight reduced. With a tank in a normally tilted position a much larger proportion of water must enter the tank in order to tilt it to the horizontal than would be necessary to tilt the same tank from a horizontal position to a tilted position. This results because the first water which enters the tank goes to fill the counter-weighted end of the tank, and it is a correspondingly longer time before the accumulation in the other end of the tank is sufficient to overbalance and tilt it.

Figure 3:
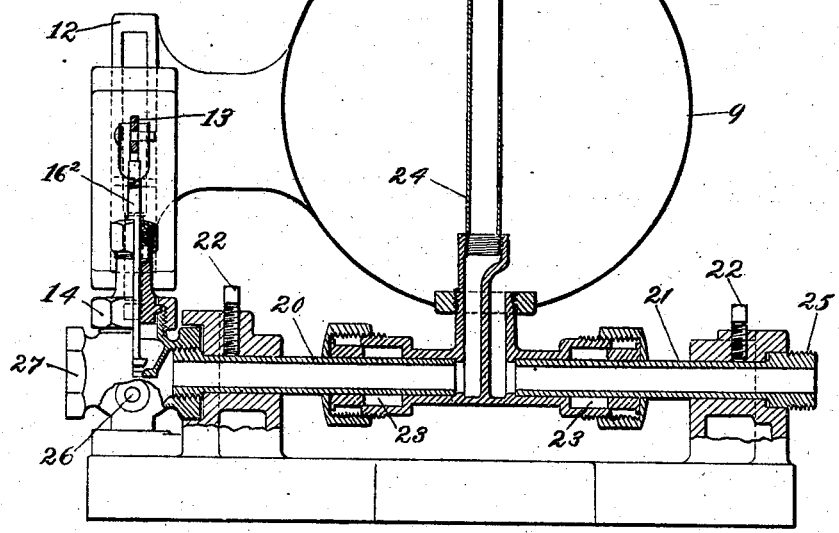
Figure 3 is a transverse section on line (3) of Figure 2, in which position the tank is discharging.

Figures 1, 2 and 3, show the return trap in which 6 is the base carrying at either end the parts 7 and 8 for supporting the tilting tank 9 when in its two extreme positions. The tank 9 is pivoted on a hollow axis 10 and carries at its end the adjustable counterweight 11. Projecting from the side of the tank is an arm provided with a loop 12, which loop embraces the arm of a lever 13, which, is adapted to operate the admission valve for live steam 14 and the air valve 15. This loop is provided on its lower side with a roller 16 for bearing against the lever 13. The roller is mounted in a block which is adjusted by means of the screw 16'. The lever 13 is normally held down by the weight 17 which is adjustable longitudinally of the lever. The lever 13 is carried upon the fulcrum lever 15' which latter is attached to the frame and is connected on one side of such fulcrum lever to the valve $16^2$ and on the other side of such fulcrum lever carries a swinging link 17' which is adapted to engage the lever 18. The lever 18 is normally held down by the weight 18' and operates the valve stem 19. It will be seen from inspection of Figure 1 that when the tank is in tilted or empty position, the valve stem $16^2$ is held down, closing the live steam valve 14 and at the same time holding open the air valve 15. Figures 2 and 3 show the tank and valves in the discharge position. The tilting of the tank has raised the lever 13 thereby opening the live steam valve 14 and allowing the air valve 15 to be closed by the weight 18'. Figure 3 shows the construction of the hollow axis 10. The hollow axis consists of two tubes 20 and 21 which are held against turning in the frame by the set screws 22. The tank is supported and revolves about the tubes and the relatively movable parts are kept tight by the stuffing boxes 23. The tube 21, as shown in Figure 3, has a connection at its inner end with the tank and at its outer end is connected at 25 with a T (not shown) which T has two connections, the one with the boiler which is provided with a check valve which permits a discharge to the boiler, but prevents a backward discharge and the other with the steam supply system or exhaust as it will be called for the sake of brevity, from which the water is to be separated in the tank. This latter connection is also provided with a check valve which valve is adapted to permit of the flow of exhaust steam into the tank but to prevent a flow in the contrary direction. This T with its connections to the boiler and exhaust provided with the check valves is the ordinary construction in traps of this general type, and no further illustration or description is thought to be necessary. The other tube 20 has as shown in Figures 1 and 3 a connection 26 through the air valve 15 with the outside atmosphere, and another connection controlled by the valve 14 with the live steam pipe which is connected at 27. I have shown the two tubes 20 and 21, but it is apparent one pipe might be dispensed with and its place taken by another pipe alongside of or inside of the other pipe. My invention comprehends this modification.

The operation is as follows: Starting with the tank in its empty position and tilted as shown in Figure 1, the live steam valve 14 is held closed by the weight 17, and the valve 15 is open. Exhaust steam is being admitted through the tube 21 and air is being forced out through the valve 15. When the tank is sufficiently filled with water so that the weight in the right hand end of the tank overbalances that in the left hand and the weight 11, the tank tilts to the position shown in Figure 2 and Figure 3. During this movement the loop 12 engages the lever 13 lifting the weight 17, opening the valve 14 for live steam, and closing the air valve 15. The live steam entering the tube 20 forces the accumulated water out through the tube 21 and into the boiler, the check in the exhaust pipe which connects with the T preventing a back flow there, and the check in the boiler connection permitting the flow through such boiler connection. The closing of the air valve 15 at the time of the opening of the live steam valve prevents any loss of pressure at that point.

Figure 5:
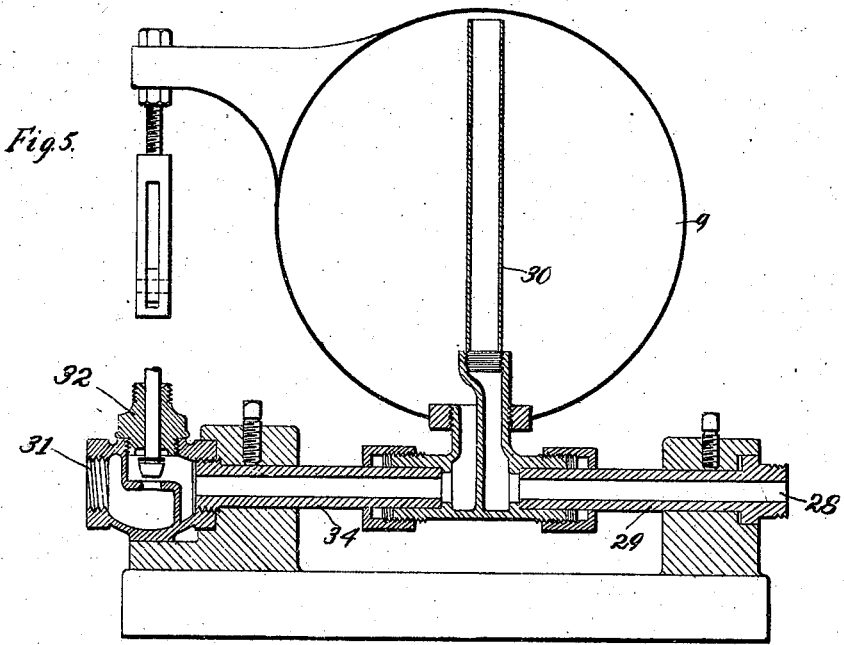
Figure 5 is a transverse section through Figure 4, on the line (4).

The non-return trap as shown in Figures 4 and 5 operates similarly, but the air valve is omitted, as is also the live steam connection. As shown in Figure 3, 28 is the exhaust connection communicating through the tube 29 and inside pipe 30 with the tank. 31 is the outflow connection controlled by the valve 32 which is operated by the lever 33. The outflow connection communicates with the tank through the tube 34. The operation is as follows: When the tank is filled with water sufficient to tilt it, it moves to the position of discharge shown in Figure 4, in which movement the lever 33 is raised, opening the valve 32 and permitting the discharge through the tube 34 and the connection 31.

Having thus described my invention and illustrated its use, what I claim as new, and desire to secure by Letters Patent, is the following:

1. In combination, a tank, an admission and exhaust axis beneath the tank and located nearer one end of the tank than the other, a counterweight at the end of the tank nearest the axis for holding the tank in tilted position when empty, direct connections from the bottom of the tank at a point adjacent the axis to the admission and discharge portions of the axis, and means operated by the tilting of the tank whereby the admission and discharge are controlled.

2. In combination a tank, an axis therefor provided with an admission valve for steam and an air valve, a fulcrum lever pivoted at the bottom and carrying a weighted lever having at one side of its fulcrum a connection with the admission valve and at the other side a depending link, a third lever pivoted at one end between the ends of the fulcrum lever, a weight on said third lever and a connection at one side of the weight with the depending link and at the other side with the air valve and means on the tank for operating the second lever.

In testimony whereof I have hereunto signed my name in the presence of the two subscribed witnesses.

WILLIAM W. DOOLITTLE.

Witnesses:
PAUL CARPENTER,
ALBERT C. HOWARD.